United States Patent [19]

Minnick

[11] 4,397,742

[45] Aug. 9, 1983

[54] COMPOSITION AND METHOD COMBINING FLUIDIZED BED RESIDUE WITH SCRUBBER SLUDGE

[76] Inventor: L. John Minnick, P.O. Box 271, Plymouth Meeting, Pa. 19462

[21] Appl. No.: 204,679

[22] Filed: Nov. 5, 1980

Related U.S. Application Data

[63] Continuation of Ser. No. 50,336, Jun. 20, 1979, abandoned.

[51] Int. Cl.³ .............................................. C02F 11/14
[52] U.S. Cl. ....................................... 210/716; 55/73; 106/109; 106/120; 106/DIG. 1; 210/726; 210/751; 264/DIG. 49; 423/244
[58] Field of Search ..................... 55/73; 106/109, 118, 106/120, DIG. 1; 210/609, 702, 712, 726, 751, 901, 716, 778; 264/DIG. 49; 423/242, 244; 405/129, 263, 266

[56] References Cited

U.S. PATENT DOCUMENTS

| | | | |
|---|---|---|---|
| 3,642,445 | 2/1972 | Muter et al. | 106/DIG. 1 |
| 3,781,408 | 12/1973 | Lin | 106/109 |
| 3,785,840 | 1/1974 | Minnick et al. | 106/118 |
| 3,859,799 | 1/1975 | Jaco, Jr. | 210/751 |
| 3,984,312 | 10/1976 | Dulin et al. | 210/751 |
| 4,250,134 | 2/1981 | Minnick | 106/109 |

OTHER PUBLICATIONS

Minnick, "Devel. of Potent. Uses for the Residue from Fluidized Bed Combustion Processes," FE-2549-3, Prepared by U.S. ERDA, 8-29-77.
Minnick, "Devel. of Potent. Uses for the Residue from Fluidized Bed Combustion Processes," FE-2549-6, Prepared for U.S. ERDA, 1-3-78.

*Primary Examiner*—Peter A. Hruskoci
*Attorney, Agent, or Firm*—Austin R. Miller

[57] ABSTRACT

A method of treating scrubber sludge removed from a gas scrubbing apparatus of the type adapted to reduce $SO_x$ content in the treated gas, is provided. The method comprises collecting the spent residue from a fluidized combustion bed of the type wherein lime or calcium carbonate particles are suspended in a fluidized medium and wherein a carbonaceous fuel is ignited proximate said fluidized medium to absorb therein substantial amounts of $SO_x$ which is generated upon ignition of said carbonaceous fuel. The fluidized bed combustion residue is then subjected to a separating treatment wherein a slurry of residue is mechanically agitated. The supernatant liquor from the slurry is separated therefrom, leaving a precipitate material which latter material is mixed with sludge. The novel composition comprises a combination of scrubber sludge and fluidized bed combustion residue precipitate, as above mentioned.

30 Claims, No Drawings

COMPOSITION AND METHOD COMBINING FLUIDIZED BED RESIDUE WITH SCRUBBER SLUDGE

This is a continuation of application Ser. No. 50,336, filed June 20, 1979, now abandoned.

FIELD OF THE INVENTION

The present invention relates to a method for treating the waste sludge removed from $SO_x$ containing gas scrubbers and the mixtures produced thereby, which mixtures are useful as suitable structural materials, especially in land reclamation projects. The mixtures of the present invention exhibit excellent dimensional stability and have high structural strength. The low permeability and the non-leachability characteristics of the mixtures make them suitable for use as embankments, dikes, pond liners, bridge abutments, etc. Further, a method for improving the dewatering characteristics of an aqueous waste sludge is provided.

BACKGROUND OF THE INVENTION

The use of coal as a fuel in electric generator plants is well known. In recent times, emphasis upon the burning of coal for this purpose has been increasing due to the dependence of this country on foreign sources for oil, the relative scarcity of oil, and the high price thereof.

As the emphasis has shifted to the use of coal fuel, considerable opposition to its use, especially to the use of "high sulfur" content fuel has steadily increased. Opponents of the use of coal rely upon the deleterious effects that $SO_x$ emission (resulting from the combustion of the coal) into the atmosphere have on the environment.

Generally, two approaches have been used to counter the problem of excess $SO_x$ emissions. The first has been to provide elaborate off-gas scrubbing units in combination with the coal boiler or furnace in coal combustion systems, usually in pulverized coal combustion systems. The more generally accepted systems utilize lime or limestone as preferred sorbents. These devices wash the gas and absorb the sulfur oxides, producing a slurry or sludge that contains the sulfur oxide in the form of calcium sulfite and calcium sulfate. Some of the sorbent material that is currently in use contains other ingredients such as dolomitic lime and/or proprietary additives. Generally, the commercial applications are based on the use of either finely ground calcium carbonate (limestone) or a suspension of calcium hydroxide which is produced from high calcium quick lime.

Commonly, the waste sludges produced by the aforementioned scrubbers contain a high proportion of relatively inert fine particulate matter and a variety of reactive materials in sufficiently small concentrations as to make the reclamation thereof uneconomical. These reactive compounds in the sludge solids include common materials such as sulfate ions, calcium ions, aluminum ions, and iron ions or sources thereof. The water content of such sludges may vary considerably and is typically in the range of 80–90% by weight.

The disposition of such sludges has always been a problem. With the increasing awareness of the undesirability of discharging such waste material into the environment and the resulting government regulations of such discharges, the need for a convenient, harmless and economical way of disposing of such sludges or converting them into a useful product is becoming increasingly apparent. A further incentive is provided by the capital investment and land required for the disposition of such sludges by conventional means, which often include large settling ponds or storage piles.

In most cases the sludge, prior to any chemical modification for disposal purposes, is subjected to a dewatering process whereby the liquid content of the sludge is decreased by means of a centrifuge and/or vacuum filter. Heretofore, sludge with high sulfite content has been extremely difficult to dewater to a commercially acceptable extent. In this regard, it has been common commercial practice to add various compounds to the sludge to effect oxidation of the sulfite to sulfate, which latter radical lends itself to better dewatering. Also, other attempts to dewater high sulfite content sludge have included the addition of certain polymeric substances to the sludge.

Another solution to the problem of excess $SO_x$ emission in coal combustion systems has been to provide a fluidized combustion bed of lime or limestone in which the coal is ignited. Preferably, the coal is pulverized and also floats within this fluidized bed during the combustion thereof. The suspended lime or limestone particles thus absorb substantial amounts of the oxidized sulfur content of the coal in the form of anhydrous sulfates. After the spent fluidized bed combustion residue has been removed from the coal boiler or furnace, problems with respect to the disposal thereof have been presented due to the above-mentioned governmental regulations pertaining to protection of the environment, and also due to the fact that the spent residue has heretofore been thought useful for few practical applications.

In my paper entitled "Development of Potential Uses for the Residue from Fluidized Bed Combustion Process," FE 2549-3, I have suggested that fluidized bed combustion residue be used (FBCR), inter alia, in the production of road base material, as a sorbent in gas scrubbers, and as a means for stabilizing scrubber sludge when fly ash is also added to a combination of the sludge-residue.

In my paper entitled "Development of Potential Uses for the Residue from Fluidized Bed Combustion Processes", FE 2549-6, I have suggested, inter alia, that a wet "blunging" pretreatment of the fluidized bed combustion residue is useful as a means of liberating the lime component of the residue and that the compressive strength of scrubber sludge may be increased by mixing of the residue, sludge, and fly ash in certain proportions.

The use of FBCR sorbents and FBCR-sludge mixtures has not been without problems, however. For instance, when the entire FBCR fraction is charged into a scrubber as a sorbent, the solids content of the sorbent is dramatically increased, causing mechanical problems due to the relatively large particle size of various components of the FBCR. Also, when an entire blunged FBCR fraction is used in a sludge mixture, dewatering problems have arisen due to the large available lime content of the residue, which lime slakes and is difficult to settle.

Accordingly, despite the foregoing, there remains a need for a method in which scrubber sludges can be converted into stabilized structural material for use as reclamation material in a commercially acceptable and economic fashion.

Also, there remains a need for a method in which the efficiency of conventional sludge dewatering techniques is improved.

Further, despite the foregoing, there remains a specific need for a method for utilizing fluidized bed combustion residue in an environmentally acceptable manner.

Of further importance is the need to provide a relatively inexpensive source of sorbent material in $SO_x$ gas scrubbers, due to the ever increasing costs of lime and limestone, which are conventionally used as $SO_x$ sorbent.

These and other objects are met by the present invention. In accordance with the invention, the precipitate from an agitated slurry of fluidized bed combustion residue is added to waste scrubber sludge in order to provide a novel composition useful in reclamation projects. If added prior to sludge dewatering, the residue precipitate acts as a filter aid and also undergoes certain hydration reactions to chemicaly bond water from the sludge, thus increasing the solids content of the sludge. If desired, the supernatant liquor separated from the fluidized bed combustion residue slurry may be fed into a $SO_x$ scrubber as a sorbent to absorb substantial amounts of $SO_x$ wherein x is 2 or 3 in the waste gas. This latter facet of the invention provides distinct economic advantage as it provides a relatively inexpensive source of lime for use as a sorbent.

DETAILED DESCRIPTION

Fluidized bed combustion residues used for purposes of my invention vary slightly in physical and chemical makeup from one boiler plant location to another. As the combustion beds of most of these plants are operated at temperatures below about 1600° F. and since the fluidized bed combustion residue is, in most cases, not rapidly quenched after ignition of the pulverized coal, the spent and collected residue comprises mostly crystalline compounds, in contrast to the production of amorphous combustion by-products which may be formed by higher heat treatment and rapid residue quenching. Also, at most plants, a stoichiometric excess of the lime or limestone needed for combustion of the coal is provided in the fluidized bed.

Various residues from different fluidized bed coal combustion system locations were subjected to different tests to determine the engineering properties as well as the chemical constituency thereof. For instance, the physical properties of the fluidized bed combustion residue taken from one boiler plant location are provided in Table I.

TABLE I

ENGINEERING PROPERTIES

1. Gradation (range of all testing to date) - ASTM D 422 - 63

| Sieve Size | % Passing Sieve |
|---|---|
| 3/8" | 100 |
| #4 | 98.8–100.0 |
| #10 | 82.5–98.8 |
| #40 | 1.4–50.1 |
| #200 | 0.2–4.1 |

2. Compaction test - ASTM D 1557 - 70 - Modified Moisture Density Relationship
   Maximum dry density - 109 pcf
   Optimum moisture content - 15.7–18.9%
3. Dry rodded weight - ASTM C 29 - 77.1 pcf
   Loose unit weight - ASTM C 29 - 72.4 pcf
4. Atterberg limits - ASTM D 423 - 66 and ASTM D 424 - 59
   Plastic limit - No plasticity
   Liquid limit - 34%
   Plastic index - non-plastic
5. California bearing ratio - ASTM D 1883 - 73

TABLE I-continued

ENGINEERING PROPERTIES

| Sample No. | 1 | 2 | 3 |
|---|---|---|---|
| Dry density (before soaking) | 91.6 pcf | 94.0 pcf | 89.3 pcf |
| Moisture content (initial) | 13.4% | 13.3% | 12.9% |
| Moisture content (top 1" after test) | 26.9% | 25.9% | 25.4% |
| Swell | 0.029 | 0.035 | 0.031 |
| Swell | 0.41% | 0.49% | 0.44% |
| Bearing ratio | | | |
| 0.10 inch | 105.0% | 85% | 58.3% |
| 0.20 inch | 106.7% | 90% | 66.7% |

With respect to Table I, in certain cases the fluidized bed combustion residue was preconditioned with sufficient water to hydrate the quick lime and release the heat of hydration prior to testing of the residue. However, the grain size analysis, dry rodded weight and loose weight determinations were performed on dry "as received" residue.

The general soil description of the fluidized bed combustion residue from the first noted plant location, based on the gradation and plasticity characteristics, is that of a uniformly graded sand. The AASHTO designation is A-1-b. The Unified Soil Classification System ascribes the letter designation SP for a poorly graded sand. Due to the friable nature of the residue, the classification could shift to SM for a silty sand after compactor forces are applied during placement of the residue in a fill. The loose and dry rodded weights of the residue are somewhat lower in value than natural sand, but the direct shear and permeability data are more typical of a silty sand.

Table II indicates the chemical constituency of the FBCR residue from the first plant location.

TABLE II

RESULTS OF CHEMICAL ANALYSIS OF FBC RESIDUE (FIRST PLANT)

| | As Received FBC Residue (%) | Milled FBC Residue (%) |
|---|---|---|
| Loss on Ignition (LOI) | 9.86 | 6.80 |
| $SiO_2$ | 11.60 | 12.30 |
| CaO | 55.82 | 56.92 |
| $Fe_2O_3$ | 4.70 | 3.66 |
| $Al_2O_3$ | 1.80 | 3.44 |
| MgO | 1.81 | 0.87 |
| $SO_4$ | 16.69 | 15.92 |

The "as received" residue from the first plant has an effective particle size diameter range of between 0.35 and 3.60 mm and an average particle size diameter of 1.7 mm. The particle shapes of grains retained on a #30 mesh sieve are flat and angular. These characteristics are more pronounced as the particle size increases up to a #4 mesh material. The large grains are flatter and subsequently subangular to a greater extent. The #8 mesh and larger material is reasonably sound and resistant to mechanical abrasion with finger pressure. Material passing through a #8 mesh sieve is readily friable, producing a light brown powder.

Coloration of the residue from the first plant on the whole is heterogeneous and various from sample to sample, but, in general, the plus #8 mesh material is uniformly reddish brown and similar to a red shell, while the intermediate particle sizes are brighter with a reddish hue speckled with black carbon and white particles. The fines are variable due to the lower percentage of fines available. They range from grey black to grey white in color. The particle size distribution of the "as received" FBC residue and the resulting alteration by "milling" (crushed and ground in laboratory jaw crusher and pulverizer) are as follows:

TABLE III

| FBCR AS RECEIVED | |
| --- | --- |
| Sieve Size | Approximate Percent Retained |
| +4 | 2 |
| +8 | 8 |
| +16 | 52 |
| +30 | 30 |
| +60 | 7 |
| +100 | 2 |
| +200 | 1 |
| −200 | trace |

| MILLED FBCR | |
| --- | --- |
| Sieve Size | Percent Retained |
| +4 | 0 |
| +8 | 2 |
| +16 | 8 |
| +30 | 18 |
| +60 | 60 |
| +100 | 2 |
| +200 | 0 |
| −200 | 10 |

The net effect of milling the "as received" FBC residue was to fracture the average residue grain into six major parts, with one constituting a fine dust.

The specific gravity of the "as received" FBC residue from the first plant was slightly reduced on milling to possibly increase carbonation and anhydration of the exposed surfaces.

Additional residue samples have been taken from two other FBC boiler locations. Table IV indicates the results of the chemical analysis of these residues whereas Table V indicates the gradation of the two residues. Table VI indicates the results of X-ray diffraction analysis of the two additional residues.

TABLE IV

| CHEMICAL ANALYSES OF SECOND AND THIRD PLANT RESIDUES | | | | |
| --- | --- | --- | --- | --- |
| | Second Plant Residue (Samples Received 6/20/78) | | Third Plant Residue (Samples Received 6/29/78) | |
| | Drum #1 | Drum #2 | Drum #1 | Drum #2 |
| L.O.I. | 15.54 | 15.54 | 0.94 | 0.66 |
| SiO$_2$ | 6.18 | 5.78 | 1.86 | 2.20 |
| Al$_2$O$_3$ | 4.13 | 3.96 | 1.22 | 2.04 |
| Fe$_2$O$_3$ | 8.37 | 7.84 | 4.18 | 3.66 |
| CaO | 47.74 | 51.42 | 63.53 | 59.49 |
| MgO | 7.06 | 7.75 | 2.03 | 3.22 |
| SO$_4$ | 11.94 | 11.96 | 26.73 | 29.04 |

TABLE V

| Sieve Size | Approximate % Passing |
| --- | --- |
| FBCR FROM SECOND BOILER LOCATION | |
| 200 | 78 |
| 100 | 92 |
| 60 | 96 |
| 40 | 98 |
| 20 | 100 |
| FBCR FROM THIRD BOILER LOCATION | |
| 200 | 0 |
| 100 | 1 |
| 60 | 4 |
| 40 | 10 |
| 20 | 31 |
| 10 | 80 |
| 8 | 86 |
| 4 | 98 |
| ¼ | 100 |

TABLE VI

| X-RAY DIFFRACTION ANALYSIS OF SECOND AND THIRD PLANT LOCATION RESIDUES | | |
| --- | --- | --- |
| | Second Plant | Third Plant |
| PEAK HEIGHTS (UNITS AT RANGE FACTOR 500) | | |
| CaSO$_4$ | 80 | 136 |
| CaO | 134 | 170 |
| CaCO$_3$ | 30 | — |
| αSiO$_2$ | 34 | — |
| COMPOSITIONAL RANGES | | |
| CaSO$_4$ | Major | Major |
| CaO | Major | Major |
| CaCO$_3$ | Minor | --- |
| αSiO$_2$ | Minor | --- |

--- 1% or less
Trace <5%
Minor 5–25%
Major >25%

In regard to the physical and chemical properties of the residue during the combustion of the pulverized coal within the fluidized medium, the temperature of the fluidized bed causes the limestone particles to liberate carbon dioxide

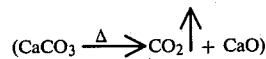

without resulting in substantial diminution of the limestone particle size. When the resulting quicklime component is subjected to the sulphur dioxide emanating from the burned coal and to the molecular oxygen existing in the combustion air, an anhydrous calcium sulfate reaction product is forced by the following reaction:

The CaSO$_4$ anhydrite is formed about the outer surface of the CaO particles and thus forms a shell which encapsulates the quicklime (CaO). The thickness of this shell is dictated by the length of exposure of the quicklime to the SO$_2$. If the CaO particle in the bed is small, the resulting reaction particle will be comprised of substantially all CaSO$_4$ anhydrite. On the other hand, and as is the case in most instances, the resulting reaction product will comprise spheres of anhydrous CaSO$_4$, with each sphere encapsulating a CaO (quicklime) core component. This factor distinguishes FBCR from other lime reaction products and provides a problem in that the CaSO$_4$ shells must be broken before the quicklime component of the residue can be released.

In accordance with the invention, after collection of the spent residue, it is slurried with water (slurry comprising about 5–20% wt. solids) in a lightning mixer which provides for mechanical agitation of the slurry. This treatment is hereinafter referred to as "blunging" and results in an overall fracturing of the CaSO$_4$ shells, a reduction in particle size, and a liberation and hydration of the free lime component of the FBC residue (accompanied incidentally by substantial heat generation). This blunging treatment is usually performed for a period of about 10-15 minutes.

The blunging treatment is an effective way of separating out most of the lime components of the FBC residue as the supernatant liquor from the slurry is pumped off, leaving a particulate precipitate material. Settling of the supernatant liquor fraction of the slurry results in the recovery of approximately 15.3% solids. In one aspect of the invention, the supernatant liquor separated from the slurry is then fed as a sorbent into a conventional gas scrubbing apparatus of the type adapted to reduce the $SO_x$ content of the gas treated therein. Since the supernatant liquor fraction of the slurry consists essentially of hydrated lime, this liquor provides an inexpensive source of lime to be utilized in conventional scrubber applications.

The chemical analysis of the precipitate material separated from a slurry of the third plant location residue is shown in Table VII.

Although the blunging technique is preferred as a means of liberating the quicklime component of the residue, other methods may also be suitably employed. For instance, slakers, hydraters, Diester tables, and other wet separation techniques may be used. The important factor is that substantial amounts of the quicklime should be separated, leaving a particulate precipitate which consists essentially of the compounds specified in Table VII.

This residue precipitate is then mixed in desired proportion with the aqueous waste sludge emanating from a $SO_x$ gas scrubbing system of the type wherein a treating agent is fed through the boiler gas scrubbing operation as a slurry to capture the sulfur oxides and convert them to sulfites and/or sulfates.

TABLE VII
CHEMICAL ANALYSIS OF THIRD PLANT LOCATION PRECIPITATE
(Separated from FBCR Slurry - all percentages are given by weight)

| | |
|---|---|
| $SiO_2$ | 2.68% |
| Aluminum and Iron Oxides | 4.40% |
| MgO | 1.98% |
| $CaCO_3$ | 50.91% |
| CaOH | 1.98% |
| $CaSO_4$ | 38.05 |

For purposes of the present invention, the scrubber sludge was produced from a pulverized coal produced from a pulverized coal boiler which was provided with a conventional lime scrubbing system. The waste sludge from said boiler (after passing thru a thickening procedure) comprised approximately 40% solids. Accordingly, due to the aqueous nature of the waste sludge, the sludge and the FBC residue precipitate material may be directly combined simply by mixing. Further, fly ash may be incorporated into the mix if desired. As is shown in the art, fly ash comprises the collected, particulate off-product ash which usually accompanies the flue gas in pulverized coal burning combustion systems. Basically, the fly ash comprises the oxides of silica, aluminum and iron. The fly ash is usually collected by means of a bag house or electrostatic precipitators.

Table VIII indicates the calculated mineral analysis of the scrubber sludge sample used in the invention.

TABLE VIII
CHEMICAL ANALYSIS OF SCRUBBER SLUDGE
Percentages Given by Weight

| | |
|---|---|
| L.O.I. | 6.20% |
| $SiO_2$ | 1.12% |
| Aluminum and Iron Oxides | 6.70% |
| MgO | 2.39% |
| $CaCO_3$ | 17.20% |
| CaOH | 8.13% |
| $CaSO_3$ | 42.66% |
| $CaSO_4$ | 15.60% |

EXAMPLE 1

FBCR taken from the third plant location was subjected to a wet blunging treatment wherein a slurry (15% weight solids) of the FBCR was mechanically agitated, and the supernatant liquor removed therefrom via a vacuum pump. Then, the resulting precipitate material was mixed with varying proportions of sludge and fly ash as indicated in Table IX.

TABLE IX
COMPARATIVE COMPRESSIVE STRENGTHS OF VARIOUS FBCR PRECIPITATE/SLUDGE MIXTURES

| | | Compressive Strength of Cured Cylinders Comprising the Mix | |
|---|---|---|---|
| MIX | RATIO | Cured at 73° F. for 28 days | Cured at 100° F. for 28 days |
| $\dfrac{\text{FBCR precipitate}}{\text{sludge}}$ | 1:1 | 3211 psf | 3773 psf |
| $\dfrac{\text{FBCR precipitate}}{\text{sludge}}$ | 1:2 | 5126 psf | 2952 psf |
| $\dfrac{\text{FBCR precipitate}}{\text{fly ash}}$ sludge | 1:1:1 | 5861 psf | 8770 psf |
| $\dfrac{\text{FBCR precipitate}}{\text{fly ash}}$ sludge | 1:1:2 | 2909 psf | 4003 psf |

For each sample, a three inch by six inch cylinder was made, and the cylinders were allowed to cure at the temperature and time conditions indicated. As utilized herein, all proportions given are by weight, unless otherwise specified. It was noted that all samples provided stable materials useful in land reclamation projects. The samples indicate that the sludge-FBCR precipitate mixture may be successfully utilized in reclamation projects, as the traditionally accepted minimum compressive strength for such purposes is about 2,500 psf.

In accordance with another aspect of the invention, proportions of aqueous waste sludge and the FBCR precipitate are mixed prior to dewatering of the sludge by centrifuge or vacuum filter techniques. The particulate precipitate migrates throughout the sludge allowing water to more readily run off. Further, due to the anhydrous nature of the $CaSO_4$ constituent of the FBCR precipitate, water of hydration is removed from the sludge due to the crystallization of the anhydrite.

$$CaSO_4 \rightarrow CaSO_4 \cdot 2H_2O$$

One such test employing equal percentages (by weight) of FBCR precipitate and sludge has been undertaken whereby the precipitate has been proven effective as a sludge dewatering aid.

EXAMPLE 2

Six 200 gram sludge samples were tested to ascertain the dewatering effectiveness of the FBCR precipitate material. With the exception of the control sample, varying amounts (by weight) of the precipitate were added to the samples prior to the vacuum dewatering of each sample by a vacuum filtration technique wherein 30 p.s.i. of pressure was utilized as the suction force. The results are shown in Table X.

TABLE X

MOISTURE CONTENT OF VARIOUS FBCR PRECIPITATE MIXTURES

| MIX | FBCR PRECIPITATE ADDED (% by weight) | % SOLIDS PRIOR TO DEWATERING | % SOLIDS AFTER DEWATERING |
|---|---|---|---|
| Control | 0 | 10 | 42.15 |
| 1 | 2 | 12 | 45.45 |
| 2 | 5 | 15 | 50.75 |
| 3 | 10 | 20 | 56.48 |
| 4 | 15 | 25 | 62.97 |
| 5 | 20 | 30 | 66.53 |

Upon comparison of runs 1, 2, 3, 4, it can be seen that the increment in percentage solids after dewatering is greater than the rise in solids content caused solely by addition of the increased amount of FBCR precipitate.

As used throughout the specification and claims, the term "FBCR precipitate" is used to signify that portion of the residue which is left after substantial amounts of the quicklime component have been separated. Further, the term "hydrated lime" as used throughout this specification refers to calcium hydroxide (hydrated high calcium quicklime) or a mixture of calcium hydroxide and either magnesium oxide (dolomitic monohydrate) or magnesium hydroxide (dolomitic dihydrate). Similarly, "limestone" refers to naturally occurring limestone or dolomite generally consisting of calcium carbonate a mixture of calcium carbonate or a mixture of calcium carbonate and magnesium carbonate.

Various modifications of my invention can be made without departing from the true spirit thereof. For instance, the "blunging" treatment by which the supernatant lime-containing liquor is separated from the particulate precipitate matter of the fluidized bed combustion residue may be substituted by other well-known separation techniques. The appended claims are intended to cover all such substitutions and equivalents.

I claim:

1. In a method of treating sludge removed from a gas scrubbing apparatus of the type adapted to reduce $SO_x$ content in the treated gas, wherein x is 2 or 3, the improvement which comprises:
   a. collecting residue from a fluidized combustion bed of the type wherein lime or limestone particles are suspended in a fluidized medium, and wherein carbonaceous fuel is subjected to combustion in a combustion bed operated at a temperature below about 1600° F. proximate said fluidized medium to capture therein a substantial amount of the $SO_x$ which is generated upon combustion of said carbonaceous fuel, thereby producing a fluidized bed combustion residue comprising mostly crystalline compounds in contrast to amorphous compounds produced in conventional high temperature combustion processes;
   b. forming an aqueous slurry with said collected fluidized bed residue with mechanical agitation to produce lime contained in an aqueous suspension and a precipitate material containing calcium sulfate anhydrite, and separating substantial amounts of the aqueous lime suspension from said precipitate material; and
   c. mixing the precipitate material with waste scrubber sludge in a ratio of 1:1–1:2 by weight of precipitate to weight of sludge.

2. Method as defined in claim 1, wherein said separating step comprises mixing said collected residue with water and separating the aqueous lime suspension as a supernatant liquor from the solid residue precipitate.

3. Method as defined in claim 2 further comprising the step of taking the separated supernatant liquor and injecting it into a gas scrubbing apparatus of the type adapted to remove substantial amounts of $SO_x$ from the gas treated therein, and washing said created gas with said supernatant liquor.

4. Method as defined in claim 1 comprising mixing about 1 part by weight of sludge with about 1 part by weight of said precipitate.

5. Method as defined in claim 1 comprising mixing about 1 part by weight of said precipitate with about 2 parts by weight of said sludge.

6. Method as defined in claim 1 further comprising adding fly ash to the precipitate-sludge mix, the amount by weight, of precipitate, fly ash, and sludge in the mix being presented in the ratio 1:1:1.

7. Method as defined in claim 1 further comprising adding fly ash to the precipitate-sludge mix, the proportions, by weight, of the precipitate, fly ash and sludge being present in the ratio of 1:1:2.

8. Method as defined in claim 1 comprising the step of dewatering the precipitate-sludge mixture subsequent to said step (c).

9. Composition comprising a mixture of (a) scrubber sludge removed from a gas scrubbing apparatus of the type adapted to reduce the $SO_x$ content of the waste gas treated therein, wherein x is 2 or 3, and (b) a precipitate material containing calcium sulfate anhydrite formed by separating the precipitate from an agitated aqueous slurry of fluidized bed combustion residue of the type wherein lime or limestone particles are suspended in a fluidized medium, and wherein carbonaceous fuel is subjected to combustion in a combustion bed operated at a temperature below about 1600° F. proximate said fluidized medium to capture therein substantial amount of the $SO_x$ which is generated upon combustion of the carbonaceous fuel, thereby producing said fluidized bed combustion residue comprising mostly crystalline compounds in contrast to amorphous compounds produced in conventional high temperature combustion processes; which ingredients (a) and (b) are mixed in a ratio of 1:1–1:2 parts by weight of precipitate to weight of sludge.

10. Composition as defined in claim 9 further comprising fly ash.

11. Composition as defined in claim 9 wherein the relative proportion, by weight, of said precipitate to said scrubber sludge is about 1:1.

12. Composition as defined in claim 9 wherein the proportion of precipitate to sludge, by weight, is about 1:2.

13. Composition as defined in claim 9 wherein the relative proportion, by weight, of the precipitate, fly ash and sludge is on the order of 1:1:1.

14. Composition as defined in claim 9 wherein the relative proportion, by weight, of the precipitate, fly ash and sludge is on the order of 1:1:2.

15. Composition as defined in claim 9 wherein said precipitate material consists essentially of the oxides of silicon, iron, aluminum and magnesium, and calcium sulfate, calcium carbonate, and calcium hydroxide.

16. In a method of treating sludge removed from a gas scrubbing apparatus of the type adapted to reduce $SO_x$ content in the treated gas, wherein x is 2 or 3, the improvement which comprises:
  a. collecting residue from a fluidized combustion bed of the type wherein lime or limestone particles are suspended in a fluidized medium and wherein coal is subjected to combustion in a combustion bed operated at a temperature below about 1600° F. proximate said fluidized medium to capture therein substantial amount of said $SO_x$ which is generated upon ignition of said coal, thereby producing a fluidized bed combustion residue comprising mostly crystalline compounds in contrast to amorphous compounds produced in conventional high temperature combustion processes;
  b. forming an aqueous slurry with said collected fluidized bed residue with mechanical agitation to produce an aqueous lime component and a precipitate material containing calcium sulfate anhydrite, and separating substantial amounts of the lime component from said precipitate material; and
  c. mixing the precipitate material with waste scrubber sludge in a ratio of 1:1–1:2 by weight of precipitate to weight of sludge.

17. Method as defined in claim 16, wherein said separating step comprises mixing said collected residue with an aqueous medium, and separating the aqueous lime component as a supernatant.

18. Method as defined in claim 17 further comprising the step of injecting the supernatant into a gas scrubbing apparatus of the type adapted to remove substantial amounts of $SO_x$ from the gas treated therein, and washing said treated gas with said supernatant.

19. Method as defined in claim 16 wherein about 1 part by weight of said sludge is mixed in step (c) with about 1 part by weight of said precipitate.

20. Method as defined in claim 16 wherein about 1 part by weight of said precipitate is mixed in step (c) with about 2 parts by weight of said sludge.

21. Method as defined in claim 16 further comprising the step of adding fly ash to the precipitate-sludge mix, the amount by weight, of precipitate, fly ash, and sludge in the mix being in the ratio 1:1:1.

22. Method as defined in claim 16 further comprising the step of adding fly ash to the precipitate-sludge mix, the proportions, by weight, of the precipitate, fly ash and sludge being in the ratio of 1:1:2.

23. Method as defined in claim 16 comprising the step of dewatering the precipitate-sludge mixture subsequent to said step (c).

24. Composition comprising the combination of scrubber sludge removed from a gas scrubbing apparatus of the type adapted to reduce the $SO_x$ content of the waste gas treated therein, wherein x is 2 or 3, and a precipitate material containing calcium sulfate anhydrate, said precipitate material being formed by separating the precipitate from an agitated aqueous slurry of fluidized bed combustion residue of the type wherein lime or limestone particles are suspended in a fluidized medium and wherein coal is subjected to combustion in a combustion bed operated at a temperature below about 1600° F. proximate said fluidized medium to capture therein a substantial amount of the $SO_x$ which is generated upon combustion of the coal, thereby producing said fluidized bed combustion residue comprising mostly crystalline compounds in contrast to amorphous compounds produced in conventional high temperature combustion processes; and wherein said scrubber sludge and said precipitate material are mixed in a ratio of 1:1–1:2 by weight of precipitate to weight of sludge prior to dewatering said sludge.

25. Composition as defined in claim 24 further comprising fly ash.

26. Composition as defined in claim 24 wherein the relative proportion, by weight, of said precipitate to said scrubber sludge is about 1:1.

27. Composition as defined in claim 24 wherein the proportion of precipitate to sludge, by weight, is about 1:2.

28. Composition as defined in claim 24 wherein the relative proportion, by weight, of the precipitate, fly ash and sludge is on the order of 1:1:1.

29. Composition as defined in claim 24 wherein the relative proportion, by weight, of the precipitate, fly ash and sludge is on the order of 1:1:2.

30. Composition as defined in claim 24 wherein said precipitate material consists essentially of the oxides of silicon, iron, aluminum and magnesium, and calcium sulfate, calcium carbonate, and calcium hydroxide.

* * * * *